(12) United States Patent
Motz et al.

(10) Patent No.: US 12,553,960 B2
(45) Date of Patent: Feb. 17, 2026

(54) DEVICE AND PROCEDURE FOR CURRENT MEASUREMENT WITH TEMPERATURE-BASED FREQUENCY RESPONSE CORRECTION IN AN ANALOG SIGNAL PATH

(71) Applicant: Infineon Technologies AG, Neubiberg (DE)

(72) Inventors: Edwin Mario Motz, Wernberg (AT); Francesco Polo, Arnoldstein (AT)

(73) Assignee: Infineon Technologies AG, Neubiberg (DE)

( * ) Notice: Subject to any disclaimer, the term of this patent is extended or adjusted under 35 U.S.C. 154(b) by 162 days.

(21) Appl. No.: 18/493,535

(22) Filed: Oct. 24, 2023

(65) Prior Publication Data
US 2024/0151784 A1  May 9, 2024

(30) Foreign Application Priority Data
Nov. 4, 2022 (DE) .......................... 102022129215.0

(51) Int. Cl.
*G01R 33/07* (2006.01)
*G01R 33/00* (2006.01)
*H03F 1/30* (2006.01)

(52) U.S. Cl.
CPC ......... *G01R 33/07* (2013.01); *G01R 33/0029* (2013.01); *G01R 33/0082* (2013.01); *H03F 1/30* (2013.01)

(58) Field of Classification Search
CPC ................ G01R 33/07; G01R 33/0029; G01R 33/0082; G01R 33/091; G01R 33/093; G01R 33/098; G01R 19/0092; G01R 15/20; G01R 35/005; H03F 1/30; H03F 3/45932; H03F 2200/261; H03F 2200/468; H03F 2203/45286; H03F 3/45475
See application file for complete search history.

(56) References Cited

U.S. PATENT DOCUMENTS

| | | | | |
|---|---|---|---|---|
| 5,331,218 A | * | 7/1994 | Moody | H03H 19/004 327/554 |
| 2013/0021098 A1 | * | 1/2013 | Gerstenhaber | H03F 1/3247 330/254 |
| 2013/0257415 A1 | * | 10/2013 | Thomas | G01N 27/9046 324/202 |
| 2015/0176964 A1 | * | 6/2015 | Uberti | G01B 7/004 702/95 |
| 2020/0018624 A1 | * | 1/2020 | Tasche | G01D 5/202 |
| 2022/0244322 A1 | * | 8/2022 | Motz | G01R 33/07 |

FOREIGN PATENT DOCUMENTS

DE  102021102051 A1  8/2022

* cited by examiner

*Primary Examiner* — Alvaro E Fortich
(74) *Attorney, Agent, or Firm* — Harrity & Harrity, LLP (57) ABSTRACT

The present disclosure relates to a current sensor, including a magnetic-field sensor for measuring a magnetic field induced by an electrical current; an output connection for providing an amplified measurement signal from the magnetic-field sensor, the magnetic-field sensor and the output connection being connected by an analog signal path having at least one amplifier, the analog signal path having a frequency response; a temperature sensor for measuring a temperature; and a compensation circuit which is coupled to the analog signal path and is configured to correct the frequency response of the analog signal path based on the temperature.

18 Claims, 8 Drawing Sheets

DEVICE AND PROCEDURE FOR CURRENT MEASUREMENT WITH TEMPERATURE-BASED FREQUENCY RESPONSE CORRECTION IN AN ANALOG SIGNAL PATH

CROSS-REFERENCE TO RELATED APPLICATION

This application claims priority to German Patent Application No. 102022129215.0 filed on Nov. 4, 2022, the content of which is incorporated by reference herein in its entirety.

TECHNICAL FIELD

The present disclosure relates to devices and methods for current measurement in which eddy-current effects are taken into account.

BACKGROUND

Some current sensors work based on the measurement of magnetic fields caused by electrical currents. Based on the strength of a magnetic field, it is then possible to deduce an electrical current inducing the magnetic field. At high frequencies, a magnetic field that is to be measured may induce eddy currents which interfere with the magnetic field that is to be measured and thus distort a measurement result. Generally, a current density of such eddy currents is temperature-dependent since the penetration depth of the eddy-current effects is influenced by the highly temperature-dependent conductivity of the conductor.

There is therefore a need for concepts for compensating for eddy-current effects in current measurement.

SUMMARY

This need is addressed by devices and methods as claimed in the independent patent claims. Advantageous developments are the subject matter of the dependent claims.

According to a first aspect of the present disclosure, a current sensor is proposed. The current sensor includes a magnetic-field sensor for measuring a magnetic field induced by an electrical current. The current sensor includes an output connection for providing an amplified measurement signal of the magnetic-field sensor. The magnetic-field sensor and the output connection are connected by an analog signal path having at least one amplifier. The analog signal path has a frequency response. The current sensor further includes a temperature sensor for measuring a temperature and a compensation circuit which is coupled to the analog signal path and is configured to correct the frequency response of the analog signal path based on the temperature. The compensation circuit makes it possible to compensate for temperature-dependent eddy-current effects in the frequency response of the analog signal path.

According to some example implementations, the compensation circuit has at least one passive filter component which is able to be switched based on the temperature. Passive filters are based on combinations of resistors (R), inductors (L) and/or capacitors (C). Since these filters can work without an external power supply, these combinations are called "passive filters". Depending on the design, the filters can act as low-pass filters, band-pass filters, high-pass filters, band-stop filters or as all-pass filters. According to some example implementations, the compensation circuit thus has resistors and/or capacitors which are able to be switched based on the temperature in order to influence the frequency response of the analog signal path in a temperature-dependent manner.

According to some example implementations, the analog signal path has a first amplifier and a second amplifier. The compensation circuit is connected between the first and second amplifiers. The first and second amplifiers can be two amplifier stages connected one after the other, such as, e.g., a preamplifier and an output amplifier. The amplifiers can—depending on the implementation—be configured as single-ended amplifiers or as differential amplifiers.

According to some example implementations, the compensation circuit has resistors and/or capacitors which are able to be switched based on the temperature and which are connected between an output of the first amplifier and an input of the second amplifier.

According to some example implementations, the first amplifier has a first transfer function having a pole at a first frequency. The second amplifier has a second transfer function having a zero at the first frequency.

A zero of a transfer function designates a root of the numerator polynomial of the transfer function, whereas a pole of the transfer function designates a root of the denominator polynomial of the transfer function. A pole frequency corresponds to a corner frequency at which the gradient of the magnitude curve of the transfer functions decreases by 20 dB/decade, and a zero frequency corresponds to a corner frequency at which the gradient increases by 20 dB/decade.

While the pole of the first transfer function at the first frequency can limit an eddy-current effect of a measuring inductor-conductor arrangement, which eddy-current effect is induced by high-frequency (AC) magnetic fields (currents), the zero of the second transfer function can compensate for this pole at the same first frequency, this resulting in a substantially flat overall transfer function around the first frequency.

Resistors and/or capacitors in the signal path which are able to be switched based on the temperature make it possible to shift such poles or zeros in a temperature-dependent manner.

According to some example implementations, the first amplifier has a non-inverting and an inverting output. The second amplifier has a non-inverting input and an inverting input. Both amplifiers can thus be configured as amplifiers for differential signal routing. The compensation circuit has a first RC element which is coupled between the non-inverting output of the first amplifier and the inverting input of the second amplifier and which has a resistor and/or capacitor that can be adjusted based on the temperature. The compensation circuit further has a second RC element which is coupled between the inverting output of the first amplifier and the non-inverting input of the second amplifier and which has a resistor and/or capacitor that can be adjusted based on the temperature.

According to some example implementations, the magnetic-field sensor has an inductor.

According to some example implementations, the magnetic-field sensor has a magnetoresistive sensor, such as, e.g., a GMR or TMR sensor. The compensation circuit can be configured to adjust a frequency dependence of feedback from an output to an input of the amplifier based on the temperature.

According to some example implementations, the current sensor further includes a control circuit which is configured to output, based on the temperature, digital control signals for adjusting resistors and/or capacitors of the compensation circuit. The digital control signals make it possible, e.g., to control switches.

According to some example implementations, the current sensor is configured as an integrated circuit (IC) in a chip package.

According to a further aspect of the present disclosure, a method for current measurement is proposed. The method includes using a magnetic-field sensor to measure a magnetic field induced by an electrical current and providing an amplified measurement signal from the magnetic-field sensor at an output connection. The magnetic-field sensor and the output connection are connected by an analog signal path having at least one amplifier, the analog signal path having a frequency response. A temperature is measured and the frequency response of the analog signal path is corrected based on the temperature. As a result, it is possible to compensate for temperature-dependent eddy-current effects in the frequency response.

According to some example implementations, the frequency response is corrected for frequencies (of the magnetic field) greater than 50 kHz. Below this threshold, eddy-current effects may be negligible.

According to some example implementations, the frequency response is corrected by switching resistors and/or capacitors in the analog signal path in a temperature-dependent manner.

According to some example implementations, the correcting of the frequency response includes shifting a pole and/or zero in a transfer function of the analog signal path in a temperature-dependent manner.

BRIEF DESCRIPTION OF THE DRAWINGS

Some examples of devices and/or methods are explained in more detail below merely by way of example with reference to the accompanying figures, in which.

DETAILED DESCRIPTION

Some examples are now described in more detail with reference to the accompanying figures. Further possible examples are however not restricted to the features of these implementations that are described in detail. These may contain modifications of the features and equivalents and alternatives to the features. The terminology used herein to describe particular examples is also not intended to be restrictive for further possible examples.

The same or similar reference signs relate throughout the description of the figures to the same or similar elements or features, which may each be implemented identically or else in a modified form, while providing the same or a similar function. In the figures, the thicknesses of lines, layers and/or regions may also be exaggerated for clarification.

When two elements A and B are combined using an "or", this is to be understood as meaning that all possible combinations are disclosed, e.g., only A, only B, and also A and B, unless expressly defined otherwise in the individual case. "At least one of A and B" or "A and/or B" may be used as alternative wording for the same combinations. This applies equivalently to combinations of more than two elements.

If a singular form, e.g., "a, an" and "the", is used, and the use of only a single element is neither explicitly nor implicitly defined as mandatory, other examples may also use multiple elements to implement the same function. When a function is described in the following as being implemented using multiple elements, further examples may implement the same function using a single element or a single processing entity. Furthermore, it is understood that the terms "comprises", "comprising", "has" and/or "having" when used describe the presence of the indicated features, whole numbers, steps, operations, processes, elements, components and/or a group thereof, but do not thereby exclude the presence or the addition of one or more further features, whole numbers, steps, operations, processes, elements, components and/or a group thereof.

Figure 1A:
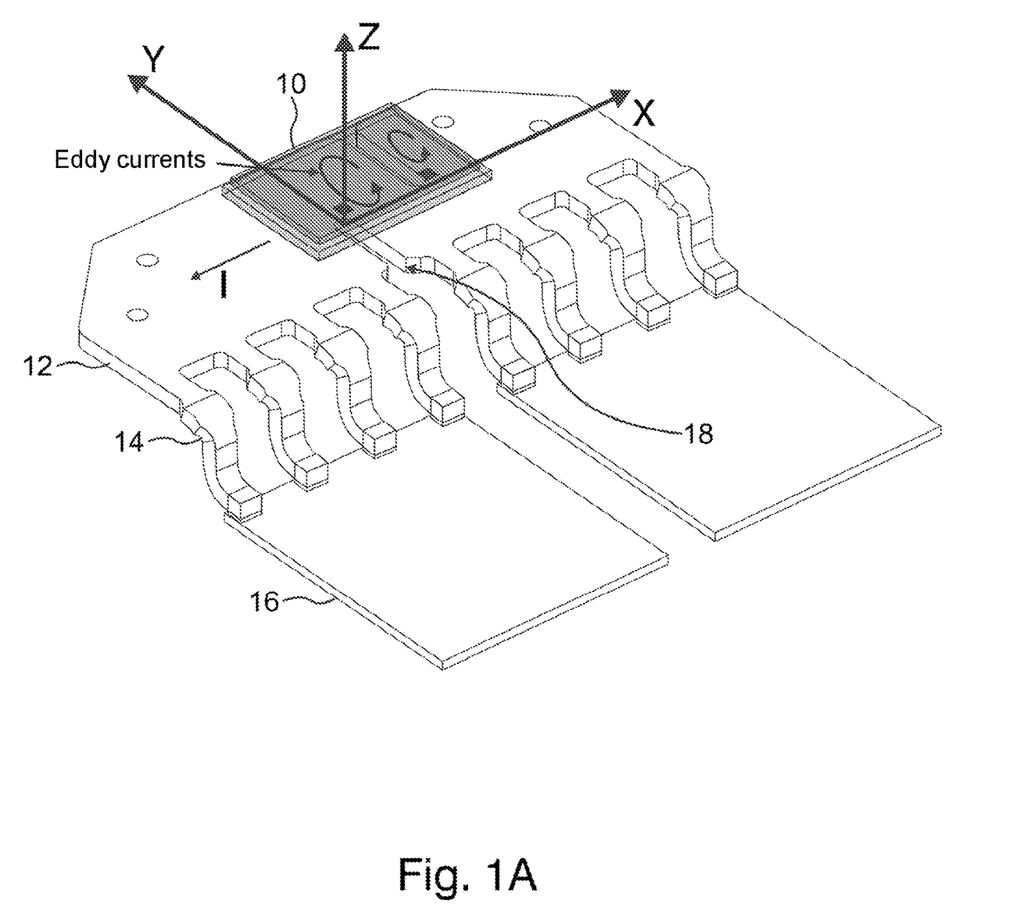
FIG. 1A shows a perspective illustration of a current sensor IC on a busbar.

FIG. 1A shows a perspective illustration of a current sensor IC 10 mounted on a busbar 12—for example made of copper. The busbar 12 is coupled to a printed circuit board (PCB) 16 via connections 14. The busbar 12 spans an x-y plane in which a current I that is to be measured flows. In order to increase a current density of the current I for the current sensor IC 10, in the example shown the busbar 12 is provided with a slot 18 below the current sensor IC 10 in the y direction, the electrical current having to flow around this slot. The electrical current in the busbar 12 induces a magnetic field in the z direction (out-of-plane), which magnetic field can be measured by the current sensor IC 10. For this purpose, the current sensor IC 10 can have, for example, a measuring inductor, a Hall sensor. Accordingly, magnetic components in the chip plane can be measured by magnetoresistive sensors (xMR sensors) which are likewise influenced by eddy-current effects in the conductor.

Figure 1B:
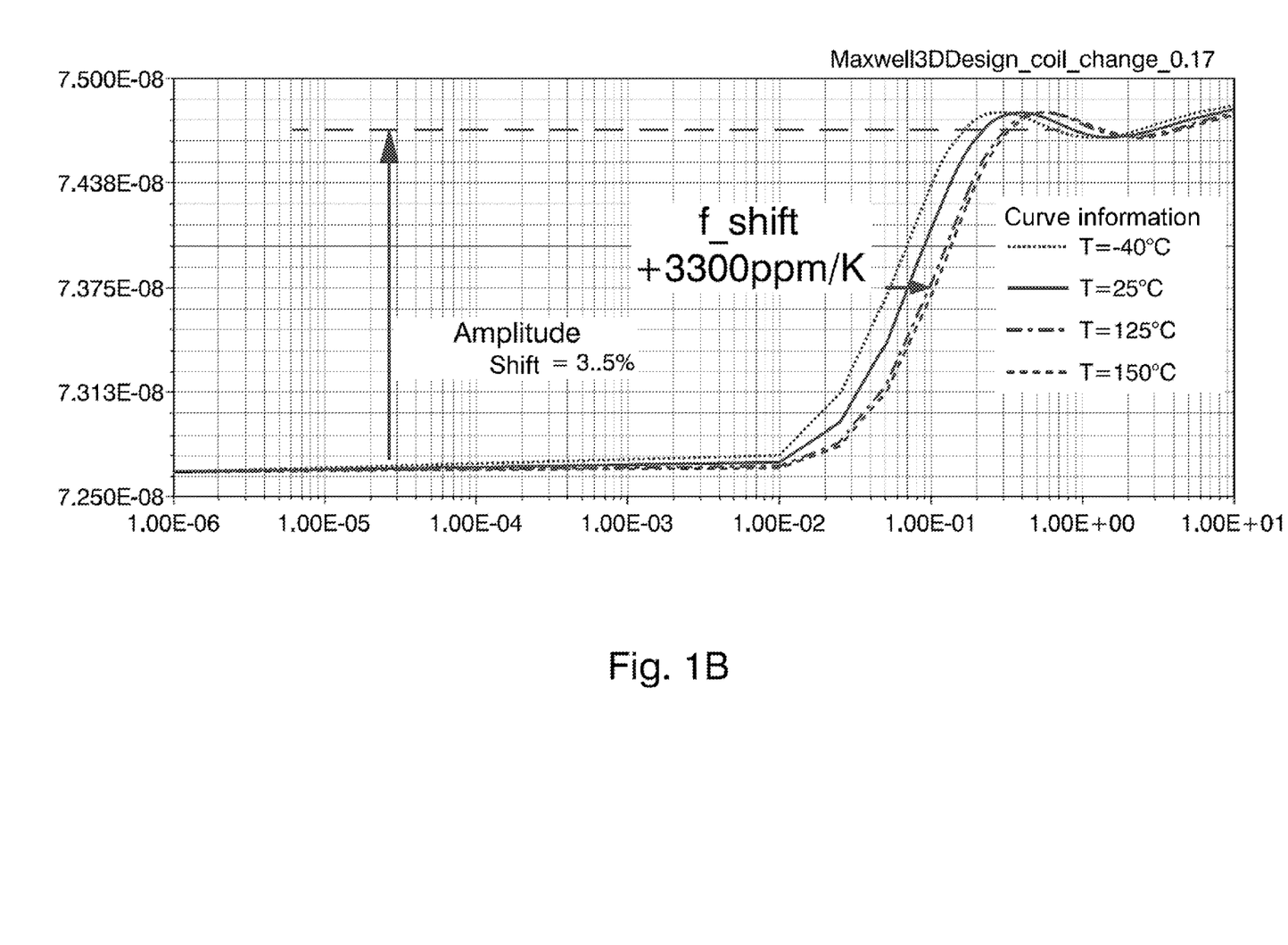
FIG. 1B shows a temperature dependence of eddy-current effects in the frequency response.

In the case of an AC current that is to be measured and therefore an AC magnetic field that is to be measured, eddy currents induced by the AC magnetic field that is to be measured can occur in addition to the AC current that is actually to be measured. These eddy currents in turn induce a magnetic field which distorts the measurement. If such eddy-current effects are not compensated for, this can result in measurement errors of a few percent (e.g., 3-5%) for frequencies >50 kHz. These measurement errors can additionally also be temperature-dependent. This relationship is illustrated in FIG. 1B which shows a measurement error, due to eddy-current effects, of 3 . . . 5% for frequencies >100 kHz. An amplitude of the measured current increases due to the eddy currents. In addition, the measurement error due to eddy-current effects is also still temperature-dependent. FIG. 1B shows an example frequency drift of the amplitude magnification, due to eddy-current effects, of 3300 ppm/K.

The present disclosure now proposes various switching concepts for current sensors which can compensate for eddy-current effects in a temperature-dependent manner.

Figure 2A:
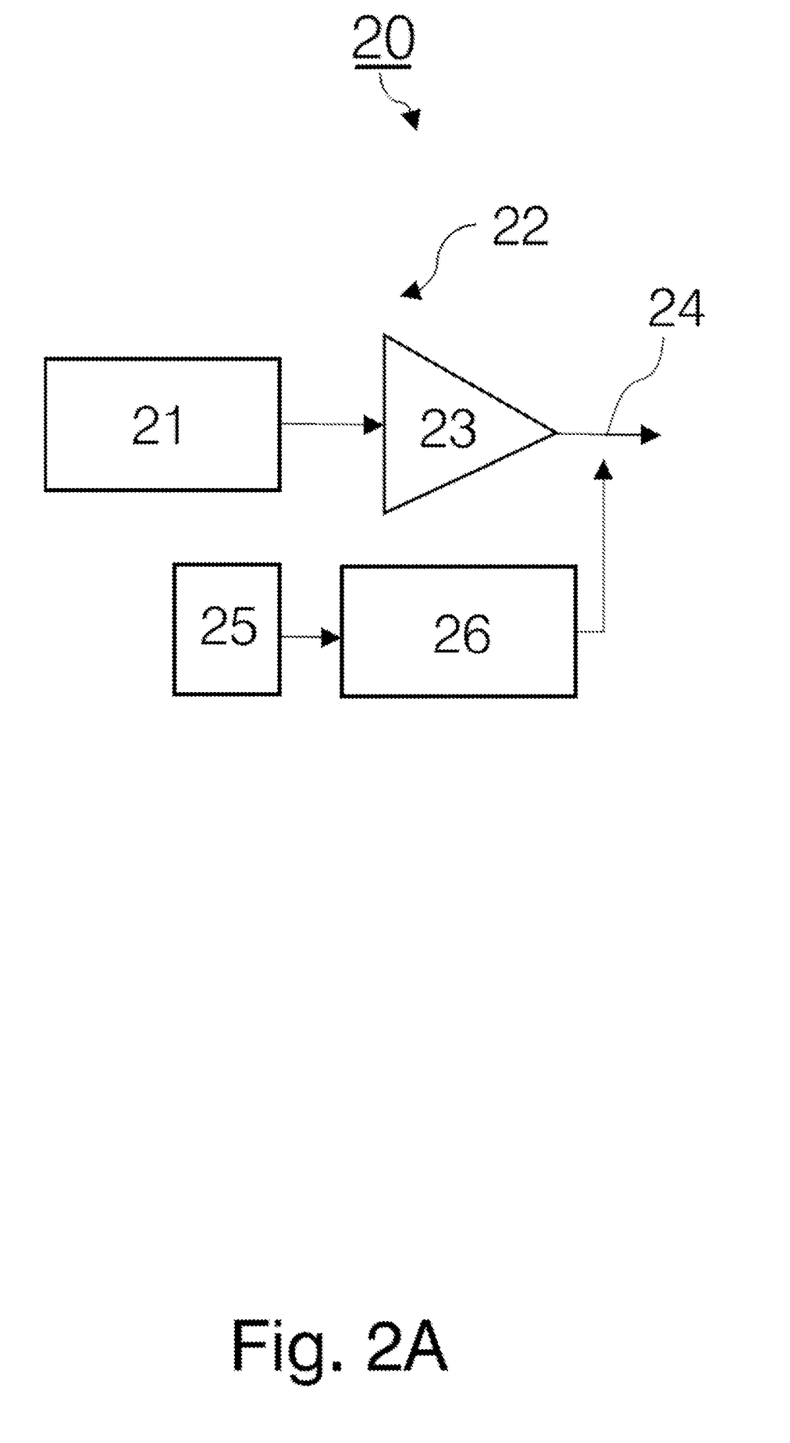
FIG. 2A shows a block diagram of a current sensor according to one example implementation.

For this purpose, FIG. 2A shows a basic block diagram of a current sensor circuit 20 according to the present disclosure.

The current sensor circuit 20 comprises a magnetic-field sensor 21 for measuring a magnetic field induced by an electrical current. The magnetic-field sensor 21 can be—depending on the implementation—a measuring inductor, a Hall sensor, or an xMR sensor. The magnetic-field sensor 21 is connected via an analog signal path 22 having at least one (analog) measuring amplifier 23 to an output connection 24 for providing an amplified measurement signal. The analog signal path 22 including the measuring amplifier 23 has a frequency response (transfer function).

The at least one (measuring) amplifier 23 can have one or more operational amplifiers (OPAs) and/or transconductance amplifiers (OTAs). Depending on the implementation, the amplifier 23 can be operated as a differential amplifier or as a single-ended amplifier. The at least one amplifier 23 can additionally have active or passive filters which influence the frequency response of the analog signal path 22. The frequency response describes the relationship between an input signal and output signal of a linear time-invariant system (LTI system) in the case of sinusoidal excitation with regard to the amplitude and the phase.

The current sensor circuit 20 further comprises a temperature sensor 25 for measuring a temperature, and a compensation circuit 26 coupled to the analog signal path 22. The compensation circuit 26 is configured to correct the frequency response of the analog signal path 22 based on the (measured) temperature. The compensation circuit 26 can be used to compensate for temperature-dependent eddy-current effects (as shown for example in FIG. 1B) in the frequency response of the analog signal path 22. For example, the compensation circuit 26 can compensate for an eddy-current-related and temperature-dependent amplitude magnification of the measurement signal.

Some example implementations of the current sensor circuit 20 having temperature-dependent eddy-current compensation are described below.

Figure 2B:
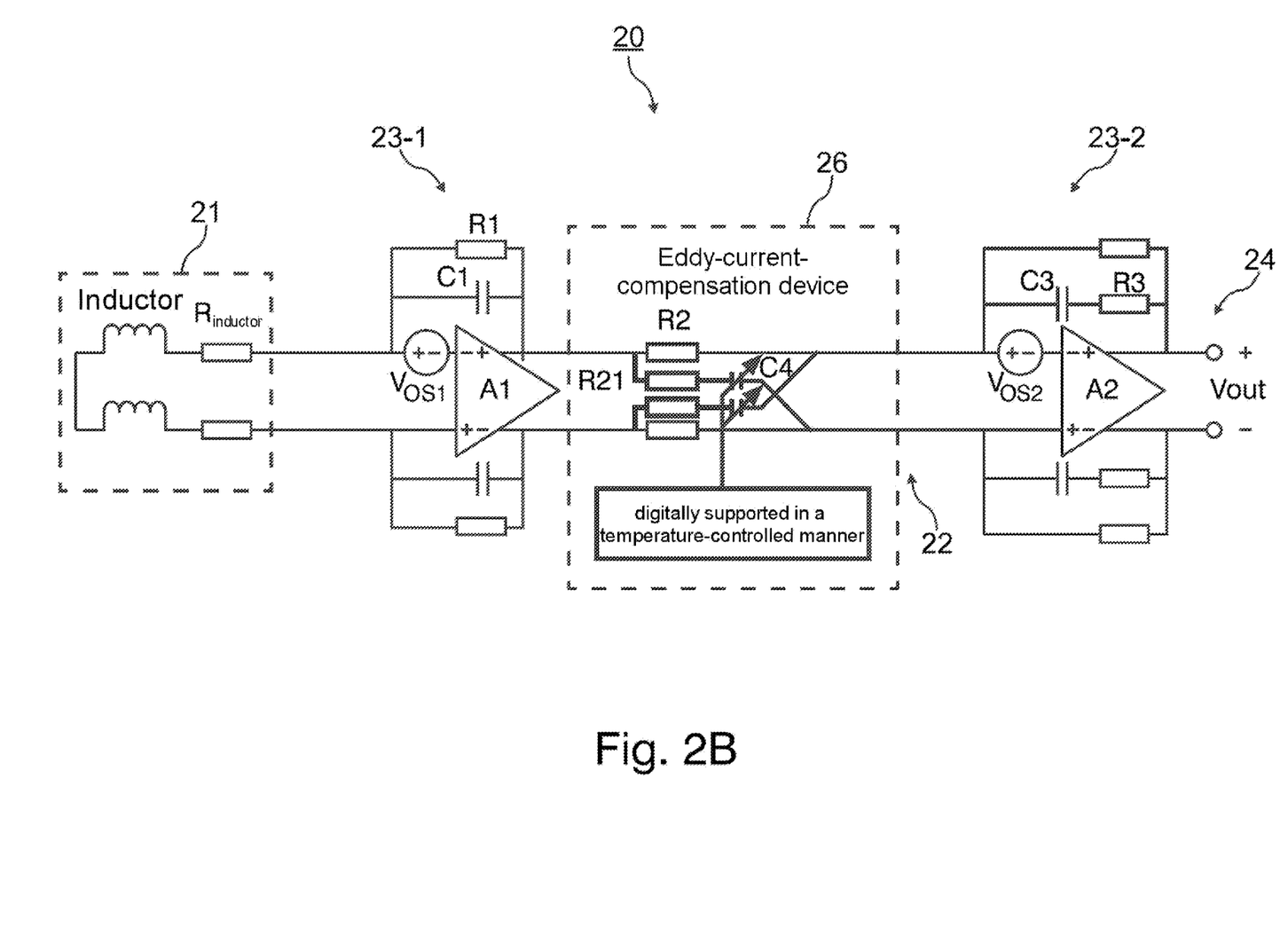
FIG. 2B shows a current sensor having two amplifier stages and an eddy-current-effect compensation circuit connected therebetween according to one example implementation.

The example implementation of the current sensor circuit 20 shown in FIG. 2B comprises a magnetic-field sensor 21 in the form of an inductor. The inductor 21 here provides a differential measurement signal having a first (upper) and second (lower) signal branch. The first signal branch of the differential measurement signal is fed to an inverting input of a first amplifier stage 23-1. The second signal branch of the differential measurement signal is fed to a non-inverting input of the first amplifier stage 23-1. Provided at the output of the first amplifier stage 23-1 are a first (upper) signal branch of an amplified differential measurement signal, via a non-inverting output, and a second (lower) signal branch of the amplified differential measurement signal, via an inverting output.

The first amplifier stage 23-1 has a first filter circuit coupled between the input and output. The first filter circuit is coupled both between the inverting input and non-inverting output and between the non-inverting input and inverting output. The first filter circuit has a parallel circuit composed of an electrical resistor R1 and a capacitor C1, which parallel circuit is coupled between the (inverting or non-inverting) input and (non-inverting or inverting) output, respectively, of the first amplifier stage 23-1. The first filter circuit has a transfer function having a pole at a first frequency $f_{p1}$. This first (pole) frequency $f_{p1}$ corresponds to a corner frequency at which the gradient of the amplitude curve of the transfer function of the first amplifier stage 23-1 decreases by 20 dB/decade. The first filter circuit can thus be a low-pass filter. The first filter circuit having the pole at the frequency $f_{p1}$ can limit the output swing of the inductor 21 for (current) frequencies greater than $f_{p1}$.

A compensation circuit 26 is coupled between the first signal branch and the second signal branch of the amplified differential measurement signal in order to correct the frequency response of the analog signal path between the measuring inductor 21 and the output 24 based on the temperature. The compensation circuit 26 has resistors R2, R21 and/or capacitors C4 which are able to be switched based on the temperature and which can be connected between the first signal branch and the second signal branch of the amplified differential measurement signal. In the illustrated example implementation, a series circuit comprising resistor R21 and (switchable) capacitor C4 is connected between the first signal branch and the second signal branch of the amplified differential measurement signal. A series circuit comprising resistor R21 and (switchable) capacitor C4 is likewise connected between the second signal branch and the first signal branch of the amplified differential measurement signal (cross coupling). It goes without saying that the compensation circuit 26 could also have other circuit arrangements which are able to compensate for the eddy-current effects in a temperature-dependent manner.

The compensation circuit 26 allows, for example, pole-zero components to be inserted into the HF signal path 22 in a temperature-dependent manner using passive elements (R and C). The pole-zero components can be changed by switching the capacitors C or resistors R in a digitally supported manner. Eddy-current effects shift to higher frequencies as the temperature increases, which can be compensated for with decreasing R or C elements.

A second amplifier stage 23-2 is provided at the output of the compensation circuit 26 of FIG. 2B. The first signal branch of the amplified differential measurement signal is fed to an inverting input of the second amplifier stage 23-2. The second signal branch of the amplified differential measurement signal is fed to a non-inverting input of the second amplifier stage 23-2. Provided at the output 24 of the second amplifier stage 23-2 are a first signal branch of a differential output signal, via a non-inverting output, and a second signal branch of the differential output signal, via an inverting output.

The second amplifier stage 23-2 has a second filter circuit coupled between the input and output. The second filter circuit is coupled both between the inverting input and non-inverting output and between the non-inverting input and inverting output. The second filter circuit has a parallel circuit composed of an electrical resistor R1 and of a series arrangement composed of resistor R3 and capacitor C3, which parallel circuit is coupled between the (inverting or non-inverting) input and output, respectively, of the second amplifier stage 23-2. The second filter circuit has a transfer function having a zero at the first frequency $f_{z2}=f_{p1}$. This zero frequency $f_{z2}=f_{p1}$ corresponds to a corner frequency at which the gradient of the amplitude curve of the transfer function of the second amplifier stage 23-2 increases by 20 dB/decade. The second filter circuit of the second amplifier stage 23-2 can thus be a high-pass filter.

The zero at the frequency $f_{z2}=f_{p1}$ can compensate for the pole at the frequency $f_{p1}$ such that an amplitude curve of an overall transfer function of the amplifier stages 23-1, 23-2 at the frequency $f_{p1}$ is substantially flat. These eddy-current effects can cause amplitude magnifications to occur, however (see FIG. 1B).

In some implementations, the inductor 21, the first amplifier stage 23-1 and the second amplifier stage 23-2 can be integrated in one common IC 10. The busbar 12 can be situated outside of the IC.

The compensation circuit 26 for compensating for eddy-current effects will now be described in more detail with reference to FIG. 2C.

Figure 2C:
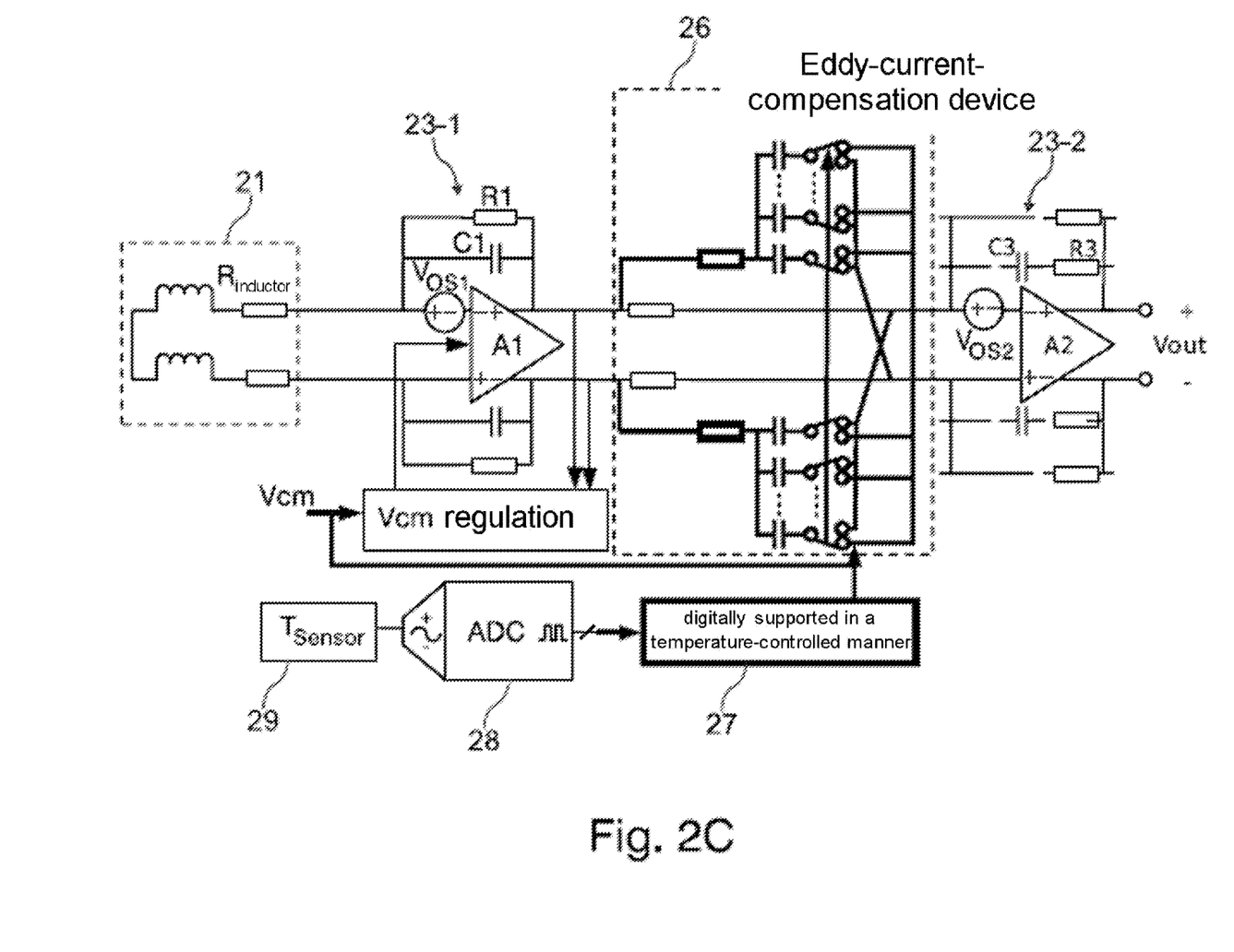
FIG. 2C shows a current sensor having two amplifier stages and an eddy-current-effect compensation circuit connected therebetween according to a further example implementation.

As already in the implementation of FIG. 2B, the compensation circuit 26 of FIG. 2C comprises resistors and/or capacitors which are able to be switched based on the temperature and which are connected between the output of the first amplifier 23-1 and the input of the second amplifier 23-2. The compensation circuit 26 has a first RC element which is coupled between the non-inverting output of the first amplifier 23-1 and the inverting input of the second amplifier 23-2 and which has a resistor and/or capacitor that can be adjusted based on the temperature. The compensation circuit 26 further has a second RC element which is coupled between the inverting output of the first amplifier 23-1 and the non-inverting input of the second amplifier 23-2 and which has a resistor and/or capacitor that can be adjusted based on the temperature. The first RC element is thus connected into the upper signal line. The second RC element is connected into the lower signal line. Cross couplings, whereby the first RC element is coupled between the upper and lower signal line and the second RC element is coupled between the lower and upper signal line, are likewise conceivable. In the implementation of FIG. 2C, a capacitor of an RC element in each case has a parallel circuit of a plurality of sub-capacitors which are able to be switched via switches.

Figure 4:
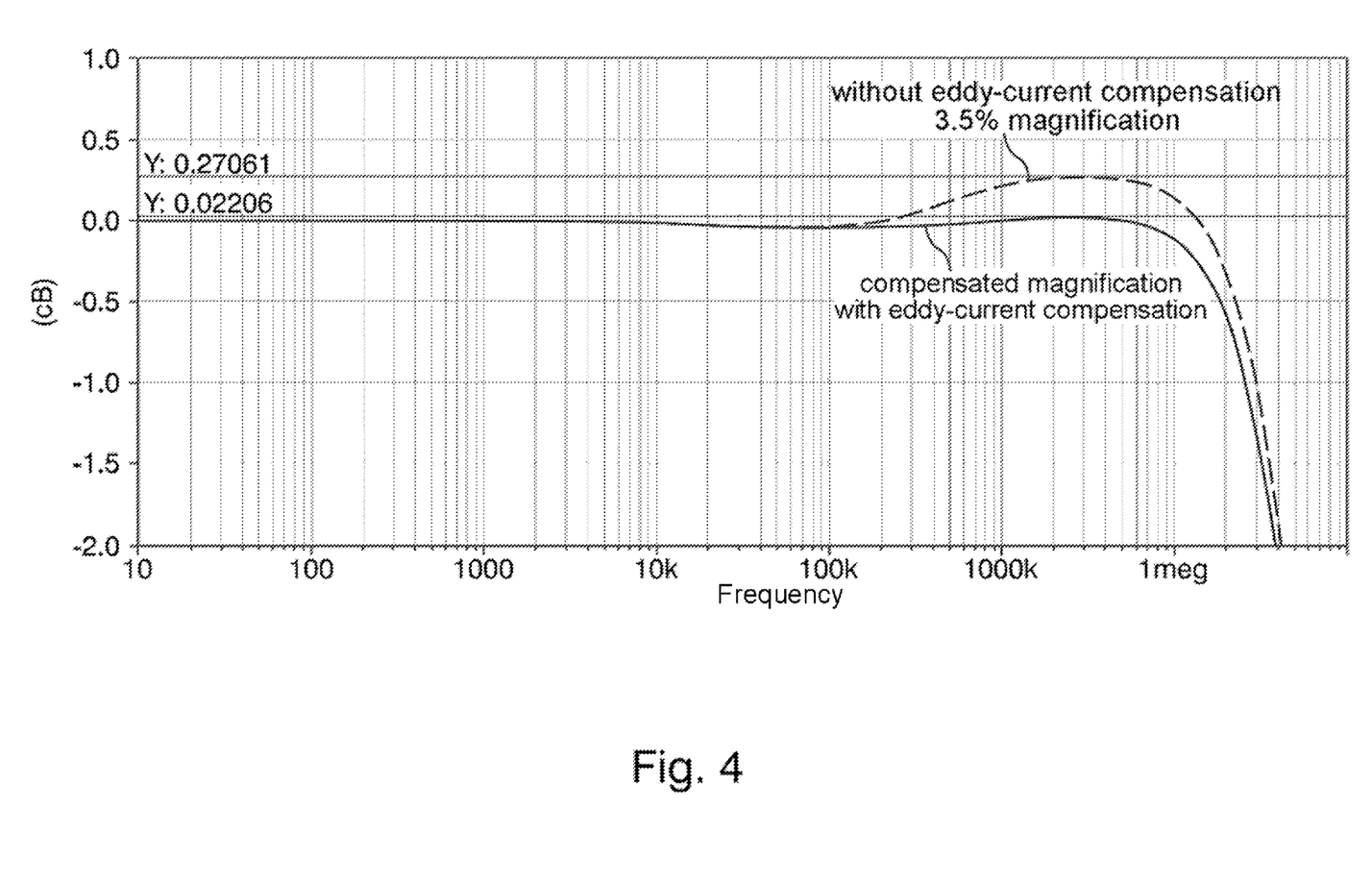
FIG. 4 shows a compensated frequency response without amplitude magnification.

Switch positions of the sub-capacitors can be controlled by a digital control circuit 27. The control circuit 27 is configured to output, based on the temperature, digital control signals for adjusting the capacitor(s) of the compensation circuit 26. The capacitor of the compensation circuit 26 can be adjusted by the number of sub-capacitors connected in parallel. For this purpose, the control circuit 27 is coupled to a temperature sensor 29 via an analog-to-digital converter (ADC) 28. For example, the control circuit 27 can reduce the number of the capacitor(s) of the compensation circuit 26 as the temperature increases and raise the number thereof as the temperature falls. FIG. 4 in addition shows, by way of example, a frequency response that has been compensated for by the compensation circuit 26, without amplitude magnification.

As indicated in FIG. 2C, the control circuit 27 can be used not only to control the (sub-) capacitors of the compensation circuit 26. It is also possible to adjust an amplification or a supply signal of the first amplifier stage 23-1 and/or of the second amplifier stage 23-2 in a temperature-dependent manner.

Figure 3A:
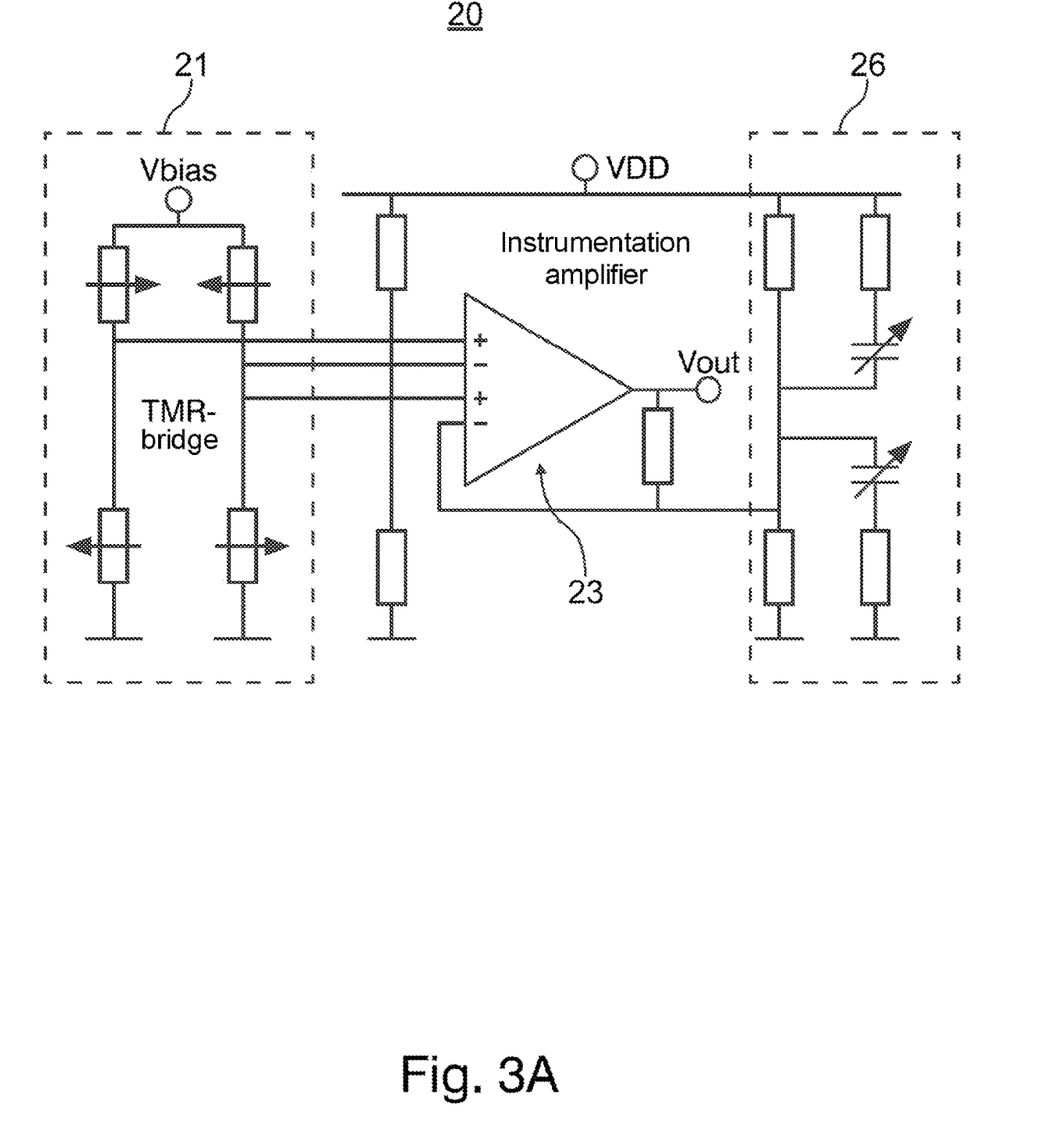
FIG. 3A shows a current sensor having an instrumentation amplifier and a compensation circuit according to a further example implementation.

FIG. 3A shows one implementation of a current sensor circuit 20 in which the magnetic-field sensor 21 has a magnetoresistive sensor (here-TMR sensor). A TMR sensor bridge delivers a differential measurement signal which is fed to a first differential input of an instrumentation amplifier 23. An output of the instrumentation amplifier 23 is fed back to a second differential input of the instrumentation amplifier 23. The compensation circuit 26 of FIG. 3A is configured to adjust a frequency dependence of the feedback from the output to the (second differential) input of the instrumentation amplifier 23 based on the temperature. For this purpose, RC elements, or capacitors thereof, coupled between the output of the instrumentation amplifier 23 and ground are configured so that they are able to be switched in a temperature-dependent manner. RC elements, or capacitors thereof, coupled between the output of the instrumentation amplifier 23 and supply potential VDD can likewise be configured so that they are able to be switched in a temperature-dependent manner.

Figure 3B:
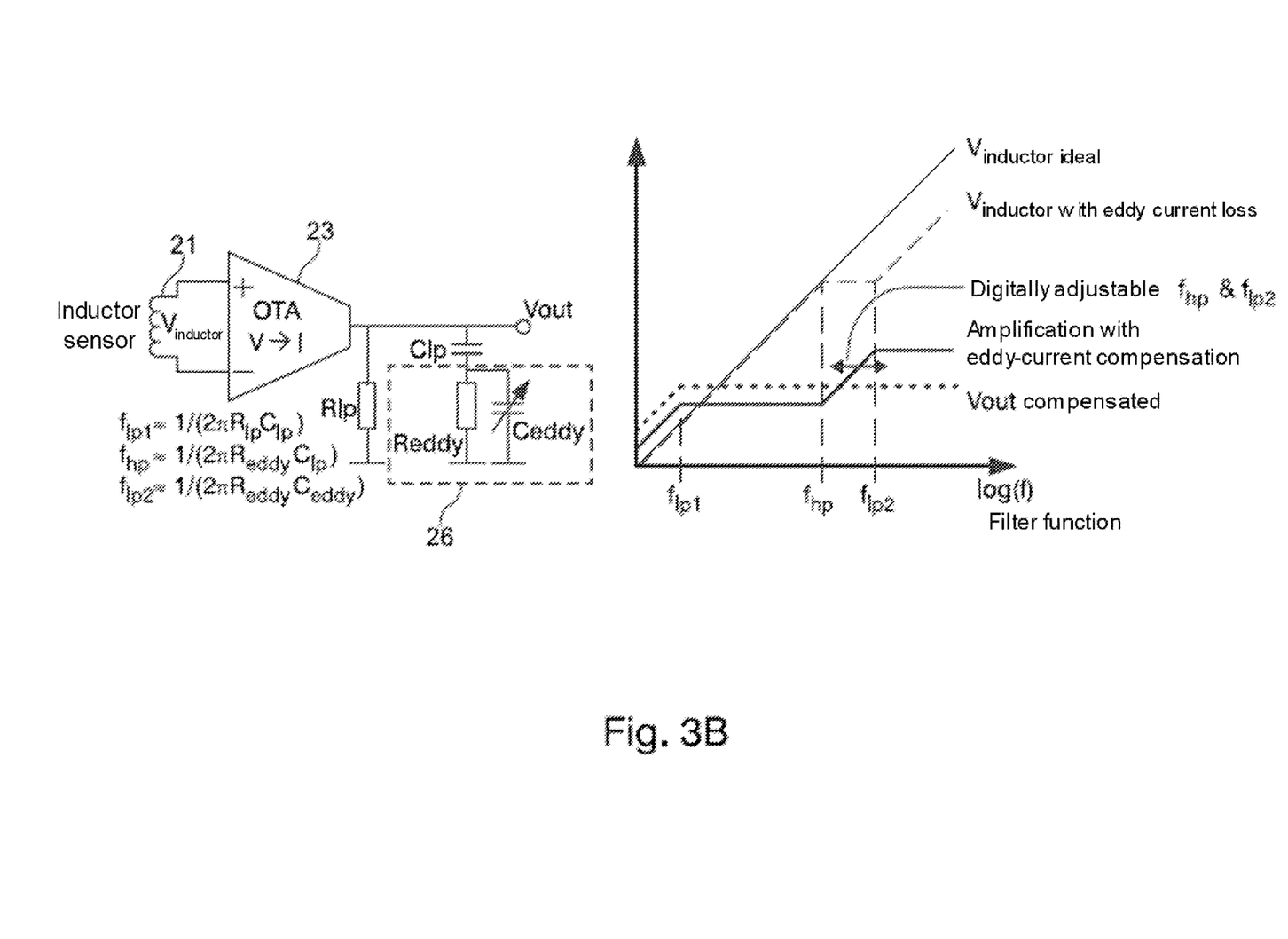
FIG. 3B shows a current sensor having a transconductance amplifier and a compensation circuit according to a further example implementation.

A further possible implementation is illustrated in FIG. 3B. FIG. 3B shows a measuring inductor 21 with a downstream transconductance amplifier 23. A low-pass filter having a pole at the frequency $f_{p1}$ is located at the output of the transconductance amplifier 23 in order to limit the output swing of the inductor 21 for (current) frequencies greater than $f_{p1}$. Furthermore, the compensation circuit 26 is also provided with switchable resistors and/or capacitors for compensating for eddy-current effects. The compensation circuit 26 here is coupled between the output of the transconductance amplifier 23 and ground.

The present disclosure proposes compensation for eddy-current effects. For this purpose, pole-zero components can be inserted using passive elements (R and C).

R or C components can be switched in a digitally supported manner in order to allow positive temperature coefficient adjustment with switched R or C components with respect to temperature changes.

Current sensors according to the present disclosure can allow high-speed current measurements and the precise detection of the zero crossing of current signals. The better a high-speed current signal can be reproduced, the better the efficiency of DC-DC converters and drives.

Example implementations of the present disclosure can allow a fast analog signal path 22 for the current measurement. A diversion via analog-to-digital conversion with ADCs, digital signal processing with possible temperature corrections in the frequency range and subsequent digital-to-analog conversion with DACs and buffer OPAs would create longer delays in the signal path and therefore limit measurement speed in the MHz range.

On the other hand, most conductors have a relatively high negative temperature coefficient of −3000-4000 ppm/K (e.g., copper). A resistor having a greatly negative temperature coefficient would thus be needed in integrated circuits in order to compensate for this. Most IC standard technologies do not have such resistors, however. The present disclosure therefore proposes making resistors and/or capacitors digitally switchable, based on the temperature, in order to thus compensate for a negative temperature coefficient of a resistor.

A positive temperature coefficient of a resistance of the busbar 12 causes a negative temperature coefficient of the conductivity in the busbar 12. This further causes a low penetration depth of the eddy-current effects in the busbar 12 and a shift of the eddy-current effects to higher frequencies at high temperatures. The present disclosure proposes to compensate for this with a negative temperature coefficient of a resistor in the analog signal path 22, because $fz=1/(2\pi RC)$. This is realized by digital measurement of the temperature. Digitally switchable resistors or capacitors can then be connected at lower temperatures and disconnected at higher temperatures. The digital switching of resistors and/or capacitors can happen relatively slowly in the ms range, which is uncritical in relation to speed requirements of the current sensor in the MHz range in the main signal path.

The aspects and features described in connection with a particular one of the previous examples may also be combined with one or more of the other examples to replace an identical or similar feature of this other example or to introduce the feature additionally into the other example.

Further, it goes without saying that the disclosure of multiple steps, processes, operations or functions disclosed in the description or claims shall not be construed as mandatory in the sequence described, unless this is explicitly stated in the individual case or is mandatory for technical reasons. Therefore, the previous description does not restrict the execution of multiple steps or functions to a specific sequence. Further, in other examples, a single step, a single function, a single process or a single operation may include and/or be broken into multiple substeps, functions, processes or operations.

If some aspects have been described in the preceding sections in connection with a device or system, these aspects are also to be understood as a description of the corresponding method. In this case, for example, a block, a device or a functional aspect of the device or the system may correspond to a feature, such as a method step, of the corresponding method. Correspondingly, aspects described in connection with a method are also to be understood as a description of a corresponding block, element, property or functional feature of a corresponding device or system.

The following claims are hereby incorporated into the detailed description, each claim being independent as a separate example. It should also be noted that—although a dependent claim in the claims refers to a particular combination with one or more other claims—other examples may also comprise a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A current sensor, comprising:
    a magnetic-field sensor configured to measure a magnetic field induced by an electrical current;
    an output connection configured to provide an amplified measurement signal from the magnetic-field sensor, the magnetic-field sensor and the output connection being connected by an analog signal path having at least one amplifier, the analog signal path having a frequency response;
    a temperature sensor configured to measure a temperature; and
    a compensation circuit which is coupled to the analog signal path and is configured to compensate for temperature-dependent eddy current effects in the frequency response of the analog signal path based on the temperature.

2. The current sensor as claimed in claim 1, wherein the compensation circuit comprises:
    at least one passive filter component coupled to the analog signal path and configured to be switched based on the temperature to shift at least one of a pole component or a zero component of the analog signal path to compensate for the temperature-dependent eddy current effects in the frequency response of the analog signal path.

3. The current sensor as claimed in claim 1, wherein the compensation circuit comprises one or more of:
    resistors coupled to the analog signal path and configured to be switched based on the temperature to correct the frequency response, or
    capacitors coupled to the analog signal path and configured to be switched based on the temperature to correct the frequency response.

4. The current sensor as claimed in claim 1, wherein the analog signal path comprises:
    a first amplifier and a second amplifier, the compensation circuit being connected between the first amplifier and the second amplifier.

5. The current sensor as claimed in claim 4, wherein the first amplifier comprising:
    a first transfer function having a pole at a first frequency, and
    wherein the second amplifier comprises:
    a second transfer function having a zero at the first frequency.

6. The current sensor as claimed in claim 4, wherein the compensation circuit comprises one or more of:
    resistors configured to be switched based on the temperature, or
    capacitors configured to be switched based on the temperature, and
        wherein the one or more of the resistors or the capacitors are connected between an output of the first amplifier and an input of the second amplifier.

7. The current sensor as claimed in claim 1, wherein the magnetic-field sensor comprises an inductor.

8. The current sensor as claimed in claim 1, wherein the magnetic-field sensor comprises a magnetoresistive sensor, and
    wherein the compensation circuit is configured to adjust a frequency dependence of feedback from an output of the at least one amplifier to an input of the at least one amplifier based on the temperature.

9. The current sensor as claimed in claim 1, further comprising:
    a control circuit configured to output, based on the temperature, digital control signals for adjusting one or more of:
        resistors of the compensation circuit, or
        capacitors of the compensation circuit.

10. The current sensor as claimed in claim 1, the current sensor being designed as an integrated circuit in a chip package.

11. The current sensor as claimed in claim 1, wherein the compensation circuit is configured to insert pole-zero components into the analog signal path based on the temperature, including changing the pole-zero components based on the temperature to compensate for the temperature-dependent eddy current effects in the frequency response of the analog signal path.

12. The current sensor as claimed in claim 1, wherein the compensation circuit is configured to insert pole-zero components into the analog signal path based on a correlation between a frequency of the temperature-dependent eddy current effects and the temperature, wherein the frequency of the temperature-dependent eddy current effects changes with the temperature.

13. The current sensor as claimed in claim 2, wherein the at least one passive filter component is configured to filter out the temperature-dependent eddy current effects from the analog signal path based on the temperature.

14. A current sensor, comprising:
    a magnetic-field sensor configured to measure a magnetic field induced by an electrical current;
    an output connection configured to provide an amplified measurement signal from the magnetic-field sensor, the magnetic-field sensor and the output connection being connected by an analog signal path having at least one amplifier, the analog signal path having a frequency response;
a temperature sensor configured to measure a temperature; and
a compensation circuit which is coupled to the analog signal path and is configured to correct the frequency response of the analog signal path based on the temperature
wherein the analog signal path comprises a first amplifier and a second amplifier, the compensation circuit being connected between the first amplifier and the second amplifier,
wherein the first amplifier comprises:
a non-inverting output and an inverting output;
wherein the second amplifier comprises:
a non-inverting input and an inverting input; and
wherein the compensation circuit comprises:
a first resistor-capacitor (RC) element which is coupled between the non-inverting output of the first amplifier and the inverting input of the second amplifier, wherein the first RC element includes at least one of:
a resistor configured to be adjusted based on the temperature, or
a capacitor configured to be adjusted based on the temperature, and
a second RC element which is coupled between the inverting output of the first amplifier and the non-inverting input of the second amplifier, wherein the second RC element includes at least one of:
a resistor configured to be adjusted based on the temperature, or
a capacitor configured to be adjusted based on the temperature.

15. A method for current measurement, comprising:
using a magnetic-field sensor to measure a magnetic field induced by an electrical current;
providing an amplified measurement signal from the magnetic-field sensor at an output connection,
the magnetic-field sensor and the output connection being connected by an analog signal path having at least one amplifier,
the analog signal path having a frequency response;
measuring a temperature as a measured temperature; and
correcting the frequency response of the analog signal path based on the measured temperature to compensate for temperature-dependent eddy current effects in the frequency response of the analog signal path.

16. The method as claimed in claim 15, wherein correcting the frequency response of the analog signal path comprises:
correcting the frequency response of the analog signal path for frequencies greater than 50 KHz.

17. The method as claimed in claim 15, wherein correcting the frequency response comprises:
switching, in a temperature-dependent manner based on the measured temperature, one or more of resistors or capacitors in the analog signal path.

18. The method as claimed in claim 15, wherein correcting the frequency response comprises:
shifting, in a temperature-dependent manner based on the measured temperature, one or more of a pole or a zero in a transfer function of the analog signal path to compensate for the temperature-dependent eddy current effects in the frequency response of the analog signal path.

* * * * *